(12) United States Patent
Coenen

(10) Patent No.: US 11,772,470 B2
(45) Date of Patent: Oct. 3, 2023

(54) WIND DEFLECTOR ASSEMBLY

(71) Applicant: Inalfa Roof Systems Group B.V., Oostrum (NL)

(72) Inventor: Tom Theodorus Maria Coenen, Melderslo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/399,413

(22) Filed: Aug. 11, 2021

(65) Prior Publication Data

US 2022/0048371 A1    Feb. 17, 2022

(30) Foreign Application Priority Data

Aug. 14, 2020 (EP) .................................. 20191148

(51) Int. Cl.
*B60J 7/22* (2006.01)
*B60J 7/043* (2006.01)

(52) U.S. Cl.
CPC .................. *B60J 7/22* (2013.01); *B60J 7/043* (2013.01); *B60J 7/0435* (2013.01)

(58) Field of Classification Search
CPC ............. B60J 7/22; B60J 7/0435; B60J 7/043
USPC ........................................... 296/217, 180.01
See application file for complete search history.

(56) References Cited

U.S. PATENT DOCUMENTS

| 2007/0222260 A1 | 9/2007 | Pocchiola | |
| 2013/0193721 A1* | 8/2013 | Wimmer | B60J 7/22 296/217 |

FOREIGN PATENT DOCUMENTS

| DE | 19524790-01 | * | 9/1996 | ................ B60J 7/22 |
| DE | 102007051878 A1 | | 5/2009 | |
| DE | 102010048964 A1 | | 4/2012 | |
| WO | 2006012861 A1 | | 2/2006 | |
| WO | WO-2007056981 A2 | * | 5/2007 | ................ B60J 7/22 |

OTHER PUBLICATIONS

Watzlawicki, "Wind deflector arrangement for openings in vehicle roof", Sep. 5, 1996, German Patent Office, Edition: DE-19524790-C1 (Year: 1996).*

(Continued)

*Primary Examiner* — Dennis H Redder
*Assistant Examiner* — Joyce Eileen Hill
(74) *Attorney, Agent, or Firm* — Westman, Champlin & Koehler, P.A.; Steven M. Koehler

(57) ABSTRACT

A wind deflector assembly includes a flexible wind deflecting material attached by a lower connecting part to a stationary part and by an upper connecting part to an upper elongate member to keep the flexible wind deflecting material taut in at least an effective position. The flexible wind deflecting material comprises a frontal part extending substantially along the front of a roof opening and further a lateral part extending from the frontal part to an end part of the flexible wind deflecting material near a hinge member. The flexible wind deflecting material comprises a first area having a first weaving density and at least a second area having a second weaving density. The second area is shaped as a strip and extends at least partly in the frontal part and in the lateral part and is bound by flexible wind deflecting material having a different weaving density.

18 Claims, 7 Drawing Sheets

(56) References Cited

OTHER PUBLICATIONS

Mathias et al.; "Wind Deflector for Motor Vehicles"; Publish Date: Apr. 24, 2007; Publisher: German Patent Office; Edition: W02007056981A2 (Year: 2007).*
European Search Report for corresponding European Patent Application No. 20191148.4 dated Jan. 28, 2021.

* cited by examiner

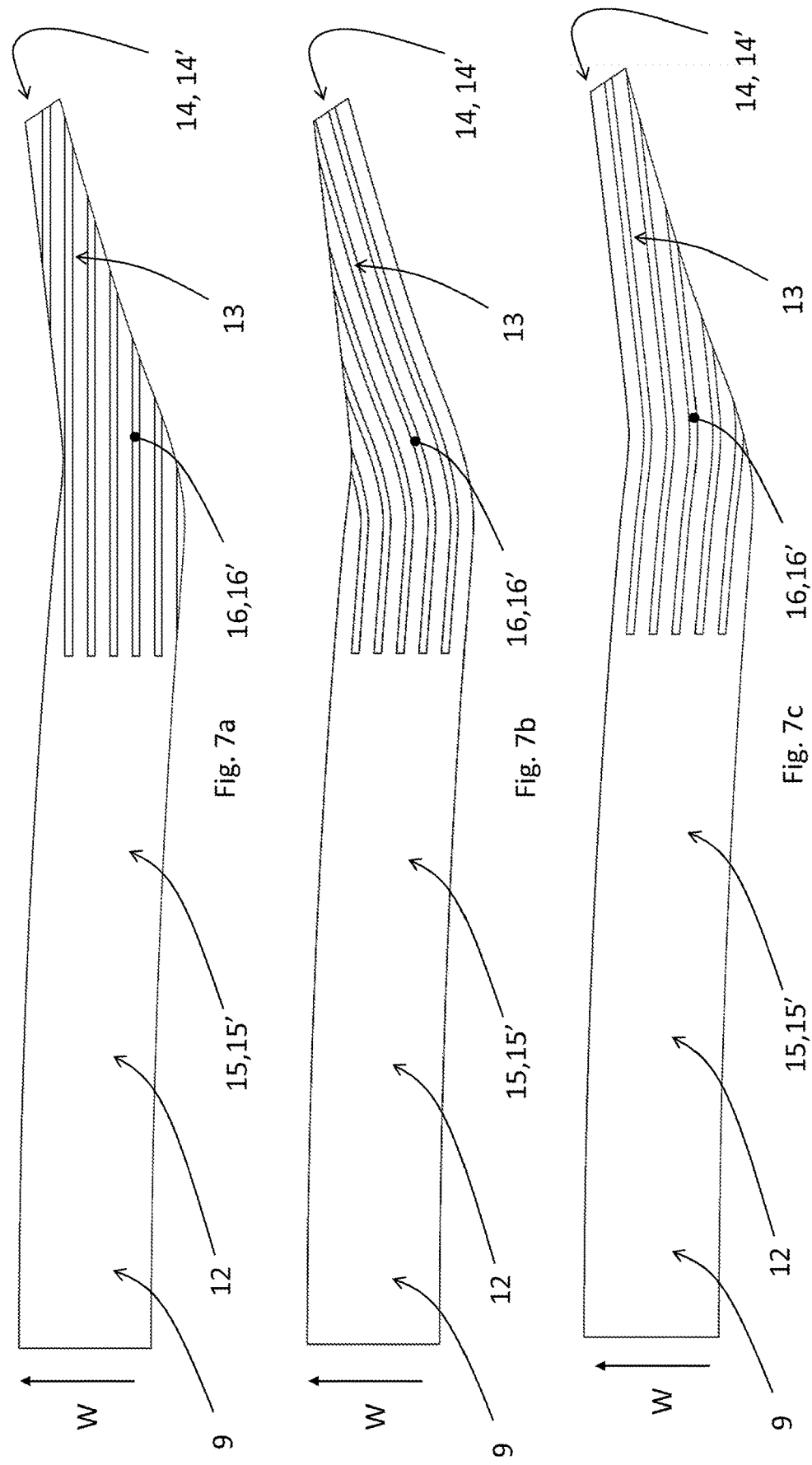

WIND DEFLECTOR ASSEMBLY

BACKGROUND

The discussion below is merely provided for general background information and is not intended to be used as an aid in determining the scope of the claimed subject matter.

The invention relates to a wind deflector assembly for use in an open roof construction for a vehicle.

Usually wind deflector assemblies in open roof constructions can be moved from an in-effective position below the surface of the fixed roof to an effective position above the surface of the fixed roof. A spring or the like usually biases the movement of the wind deflector assembly from the ineffective position towards the effective position. The movement back from the effective position to the in-effective position is usually done under the influence of the closure. In the effective position of the wind deflector assembly, the flexible wind deflecting material extends between a lower connecting part which is attached to the stationary part and an upper connecting part with which the flexible wind deflecting material is connected to the wind deflector upper elongate member. The wind deflecting material is kept taut in between these parts.

The flexible wind deflecting material extends in lateral direction along the front edge of the roof opening and in the corner areas of the roof opening the flexible wind deflecting material extends with a substantially radius shape following the radius shaped corners of the upper elongate member and continuous rearwards towards the hinge member of the wind deflector assembly. Also in these corner areas the flexible wind deflecting material needs to be taut. Especially in the corner areas and the rearward parts of the flexible wind deflecting net, it may happen that under vehicle dynamic circumstances, the flexible wind deflecting material may not be taut enough and will start to flutter causing aero acoustic noises which are not desirable. So in these areas and in the lateral ends of the frontal part of the wind deflector material it may be required to stiffen the net with reinforcing counter measures. During the movement of the wind deflector assembly from an effective to an ineffective position, the tension in the wind deflecting material gradually reduces and is eventually completely withdrawn. In such situations in driving conditions the flexible wind deflecting material may hang loose and may be subject to the wind force, whereby the net may be pushed by the wind in between edges of the seal attached to edge of the roof opening and the closure when the closure drives into its closing position.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A wind deflector assembly is disclosed for use in an open roof construction for a vehicle having a roof opening in its fixed roof. The open roof construction comprises a stationary part, and at least a closure movably connected with the stationary part and adapted to close the roof opening in the fixed roof and to selectively open the roof opening. The wind deflector assembly is positioned near the front of the roof opening and is movable between an ineffective position below the fixed roof and an effective position above the fixed roof.

The wind deflector assembly comprises an upper elongate member having arms extending in a rearward direction, each of which are movably connected to the stationary part, by a hinge member. A flexible wind deflecting material is attached by a lower connecting part to the stationary part and by an upper connecting part to the upper elongate member to keep the flexible wind deflecting material taut in at least the effective position. The flexible wind deflecting material comprises a frontal part extending substantially along the front of the roof opening and further a lateral part extending from the frontal part to an end part of the flexible wind deflecting material near the hinge member. The flexible wind deflecting material comprises a first area having a first weaving density. The flexible wind deflecting material further comprises at least a second area having a second weaving density, the second area being shaped as a strip and extending at least partly in the frontal part and in the lateral part and being bound by flexible wind deflecting material having a different weaving density.

The second weaving density of said second area is preferably higher than the first weaving density of the first area.

Due to this second area having a second weaving density the wind deflecting material and the frontal part and left hand and the right hand lateral parts of the wind deflecting material are made stiffer such that the lateral parts of the wind deflecting material may be stiffer in the effective position of the wind deflector assembly and do not flutter under dynamic circumstances. Also due to these lateral parts being stiffer, they might be prevented from being clamped between the closure and the seal attached to the aperture edge when the closure closes the roof opening.

When the closure closes the roof opening and engages the wind deflector arms by means of a slide pad attached to the lower side of the closure, the wind deflector assembly is pushed downwards whereby it moves around its movable hinge member of the wind deflector arms with the stationary part. The second area is strip-shaped and woven with a second weaving density which is a higher density as part of the flexible wind deflecting material which limits the strip-shaped second area. The flexible wind deflecting material is a product made of woven material in a weaving process whereby in the first and second area and as later on described in a third area, the material is woven in a different weaving density, whereby the first, second and third areas may be part of one woven product and each of the areas are integrated in the product and as such connected to each other via the weaving process.

The effect of the higher weaving density in the second area and, as later on described, third area as opposed to the first area is that the flexible wind deflecting material is less flexible and therefor more stiff which results in a reinforcing area in the flexible wind deflecting material. Next to this, the higher weaving density gives a lower permeability to air which may influence the aero acoustic performance in a positive manner.

In another embodiment the second area extends continuously along the frontal and lateral parts of the flexible wind deflecting material. In case the folding behaviour of a flexible wind deflecting material not having any reinforcing strips may lead to clamping problems not only in the lateral part, but also in the frontal part, the second area may extend not only in the lateral part but also extend completely along the frontal part.

In yet another embodiment the second area is bound by at least a third area having a third weaving density. This third area may extend adjacently below or above the stripe shaped second area. The third area may comprise a density that is different to the first and the second area, to improve the stiffness of the flexible wind deflecting material further and so to meet requirements of aeroacoustics and folding behaviour of the flexible wind deflecting material.

In yet another embodiment said first weaving density of said first area is lower than the second and third weaving density of the second respectively third area and wherein the second density of the second area is higher than the third density of the third area or the second density of the second area is lower than the third density of the third area. Since the strip-shaped second area will be smaller in width compared to the first or third areas extending adjacently below or above, it may be conceivable that in order to establish an required stiffness of the flexible wind deflecting material to meet the aero acoustic and folding requirements, the densities of the second and third areas are adjusted such that either the second area has the highest weaving density or the third area has the highest density.

In another aspect of the invention is that the second area has a height H2 in the range of 2 mm to 12 mm and preferably in the range of 4 mm to 8 mm and in particular having a height of ca. 6 mm. and the third area has a height H3 in the range of 2 mm to 16 mm and more preferably in the range of 6 mm to 10 mm and in particular having a height of ca. 8 mm. Next to the reinforcing effect that the second area implies, there is also another effect, namely that the second and if present the third area of the flexible wind deflecting material in the effective position of wind deflector assembly is visible from the inside and outside of the vehicle. This means that the second and if applicable third area may be subjected to certain styling requirements. So an optimum dimension of the height of the second and third areas may be depending on the stiffness applied by the second respectively third area and at the same time, the styling requirements and these may thus influence the height of the second and third areas.

According to another embodiment the strip-shaped second area has a varying height extending along the flexible wind deflector material. This may be conceivable when, in the lateral parts, the strip-shaped second areas and if applicable the third areas in the flexible wind deflecting material extending towards the end of the net near the hinge member need to be made thinner because of the lack of the space in the net.

According to another aspect of the lateral part of the strip-shaped second area extends at least partly under an angle with regard to the frontal part of the strip-shaped second area. Depending on the position of the upper elongate member relative to lower connecting part, when the wind deflector assembly is in its effective position, the frontal part of the net and the lateral part of the net may extend at an angle towards each other. This angled condition may be explained best, imagining the net in isolated condition, lying on a flat surface, whereby the frontal part extends in an angle with the lateral part. This may imply that for reinforcing reasons of the lateral part of the net the second area and if applicable the third areas extend also under an angle. Such an angle may also be implied for styling reasons.

According to another embodiment the flexible wind deflecting material is directly moulded to the upper elongate member. In such embodiment the upper connecting part may be omitted and to directly mould the flexible wind deflecting material to the upper elongate member.

BRIEF DESCRIPTION OF THE DRAWINGS

FIGS. 7*a*, 7*b*, 7*c* are views of the flexible wind defecting material having two different contour shapes when stretched out in one flat plane.

DETAILED DESCRIPTION OF THE ILLUSTRATIVE EMBODIMENTS

Figure 1:
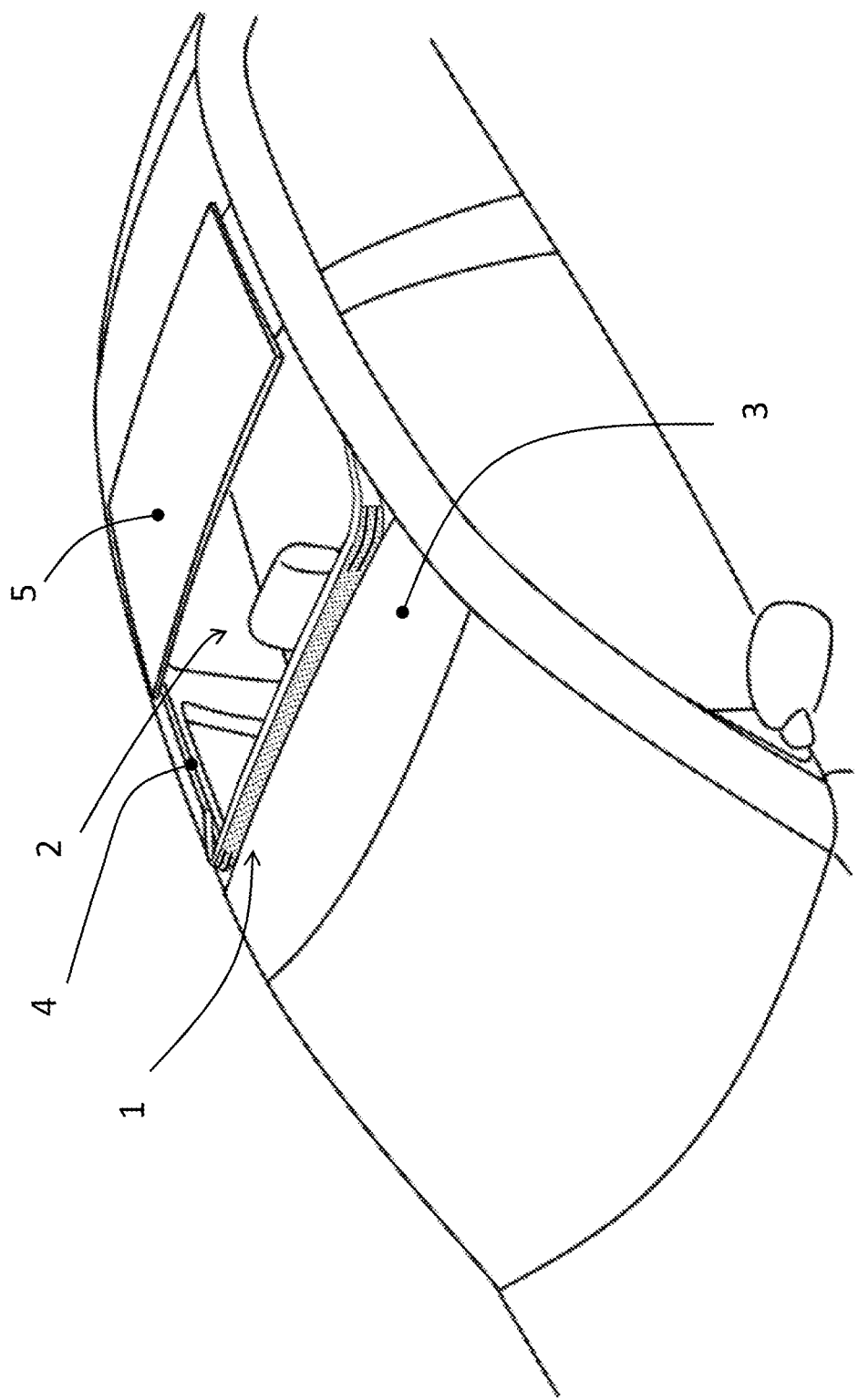
FIG. 1 is a schematic perspective view of a vehicle roof having an open roof construction comprising the wind deflector assembly.

Referring to FIG. 1 a vehicle roof is shown having an open roof construction with a roof opening 2 which can be opened and closed by a closure 5. This closure 5 is part of the open roof construction of the vehicle. The closure 5 is a rigid at least partly transparent panel, made of glass, plastic or the like. The open roof construction further comprises a wind deflector assembly 1 and a stationary part 4 with which the open roof construction is mounted to the body of the vehicle. The wind deflector assembly 1, which is placed near the front edge of the roof opening 2, is capable of being stored in an ineffective position below the surface of the fixed roof 3 of the vehicle and below the closure 5 and is capable of being extended to an effective position whereby a part of the wind deflector assembly 1 is above the surface of the fixed roof 3 and whereby the closure 5 is in an open position.

For influencing the air flow pattern above the roof opening 2 when the closure 5 is in its open position, the wind deflector assembly 1 is extended partly above the surface of the fixed roof 3 to an effective position. The wind deflector assembly 1 comprises a flexible wind deflecting material 9 attached on an upper end with an upper connecting part 11 to the upper elongate member 6 and on a lower end with lower connecting part 10 to the stationary part 4 and extending substantially along the front area of the roof opening 2. The flexible wind deflecting material 9 is permeable to air. When the wind deflector assembly 1 is extended in its effective position, air flowing through the flexible wind deflecting material 9 becomes turbulent at the lee side of the wind deflecting material 9 due to the narrow openings in this material. This turbulent airflow avoids or at least reduces the phenomena of buffeting when the closure 5 is in its opened position.

Figure 2:
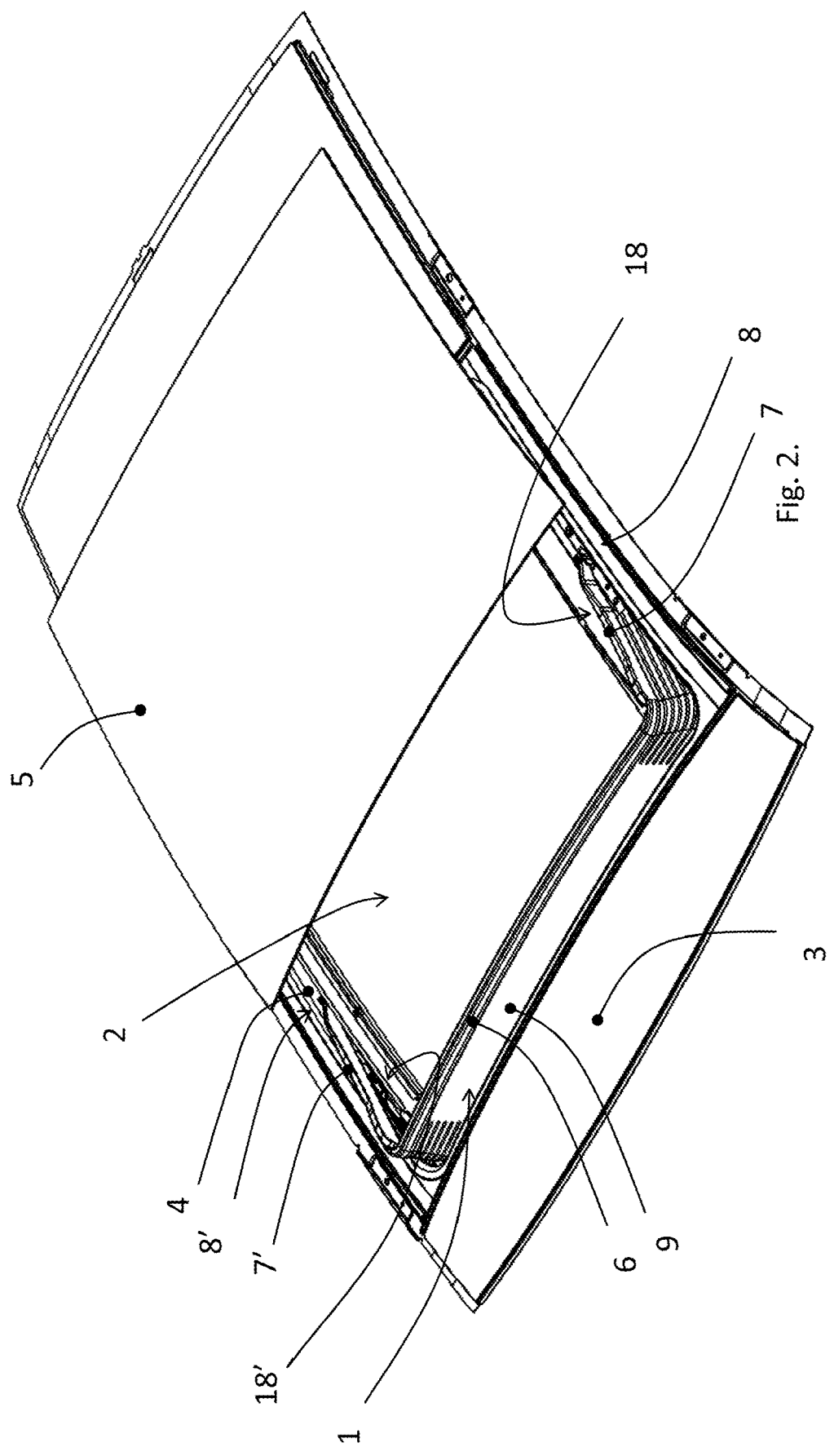
FIG. 2 is a schematic perspective view of the open roof construction showing the wind deflector assembly in a preferred embodiment.
Figure 3:
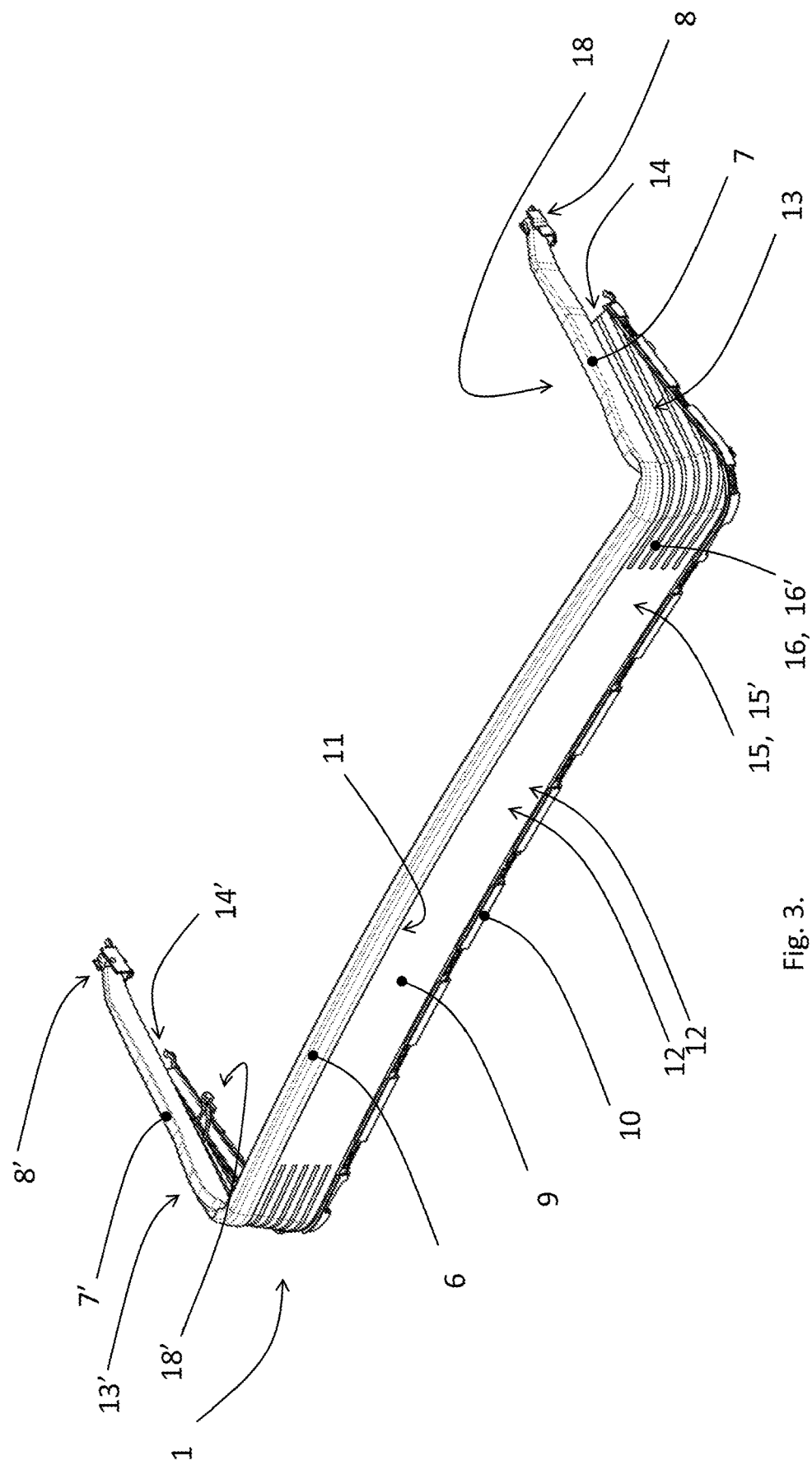
FIG. 3 is a schematic perspective view of the wind deflector assembly.

Referring further to FIGS. 2 and 3 the wind deflector assembly 1 comprises further an upper elongated member 6 extending in transverse direction and connected on each lateral end arms 7, 7'. The left and right arms 7, 7' are pivotally connected to the stationary part 4 by means of hinge members 8, 8'. A biasing device 18, 18' is provided at each arm 7, 7' which biases the wind deflector arms 7, 7' relative to the stationary part 4 in an upward direction. The flexible wind deflecting material 9 extends from lower connecting part 10, with which it is connected to the stationary part 4, towards an upper connecting part 11 with which it is connected to the upper elongated member 6. The flexible wind deflecting material comprises a frontal part 12 extending in transverse direction along the front part of the roof opening 2 and a lateral part 13, 13' extending from the frontal part 12 towards the end part 14, 14'. Furthermore a first area 15 having a first density 15' is shown, for the greater part extending in the frontal part 12 of the flexible wind deflecting material 9 but also partly in the lateral parts 13,13'. A second strip-shaped area 16 having a second density 16' is shown partly in the frontal part 12 and the lateral parts 13, 13'.

Each of these strip-shaped second areas 16 are woven into the base material, being the flexible wind deflecting material 9 having the first density 15'.

These strip-shaped second areas 16 are bound by flexible wind deflecting material 9 having another density, in this case bounded by the first area 15 having the first density 15'.

Figure 4:
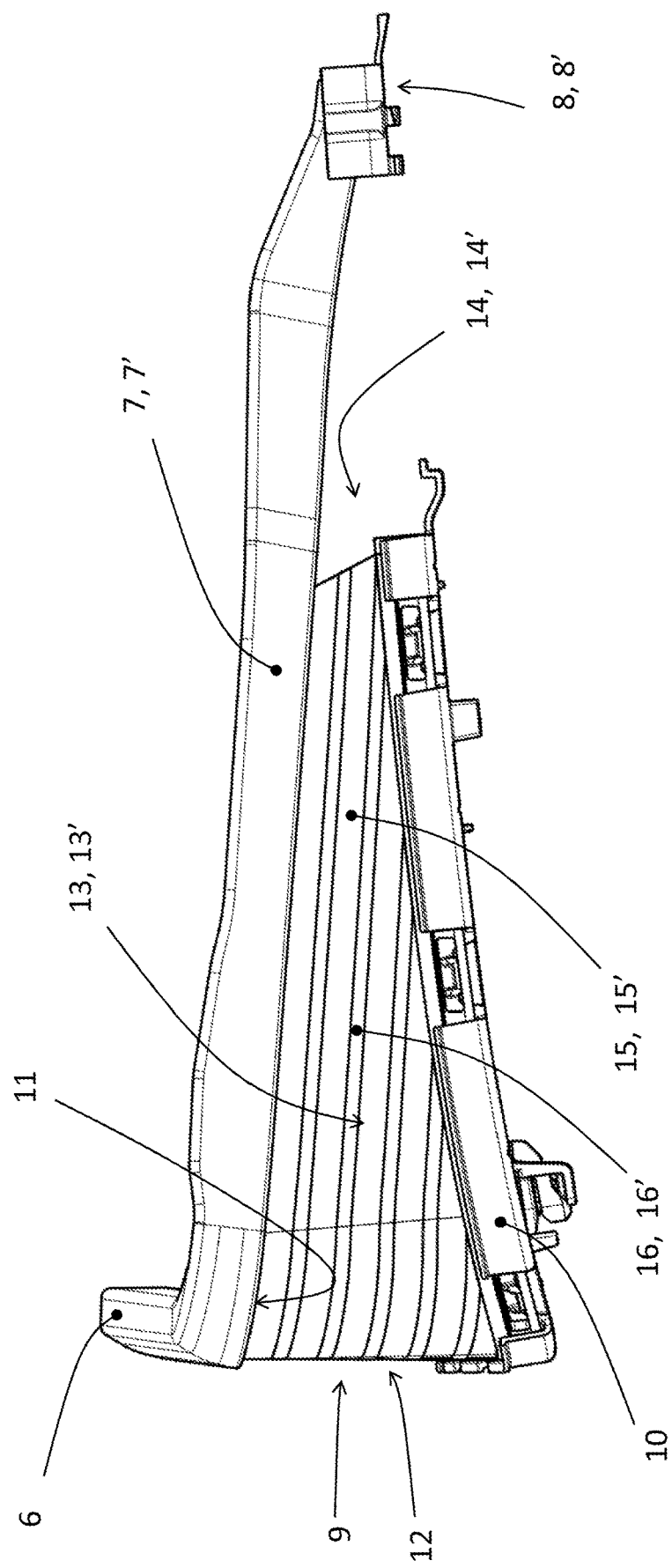
FIG. 4 is a side view of the wind deflector assembly.

Referring to FIG. 4 a side view of the wind deflector assembly 1 is shown. The lateral part 13, 13' is shown extending between the lower connecting part 10 with which it is connected to the stationary part 4 and an upper connecting part 11 with which it is connected to the upper elongate member 6.

The strip-shaped second areas 16 extend towards the end part of the net 14, 14'. In this view the second areas 16 extend substantially parallel to and spaced from the upper elongate member 6. However these strip-shaped second areas 16 may also extend under an angle with the upper elongate member 6, e.g. in a plane more horizontally or in a plane more vertically. The strip-shaped second areas 16 then are spaced from the upper elongate member 6 for the greater part thereof.

Figure 5:
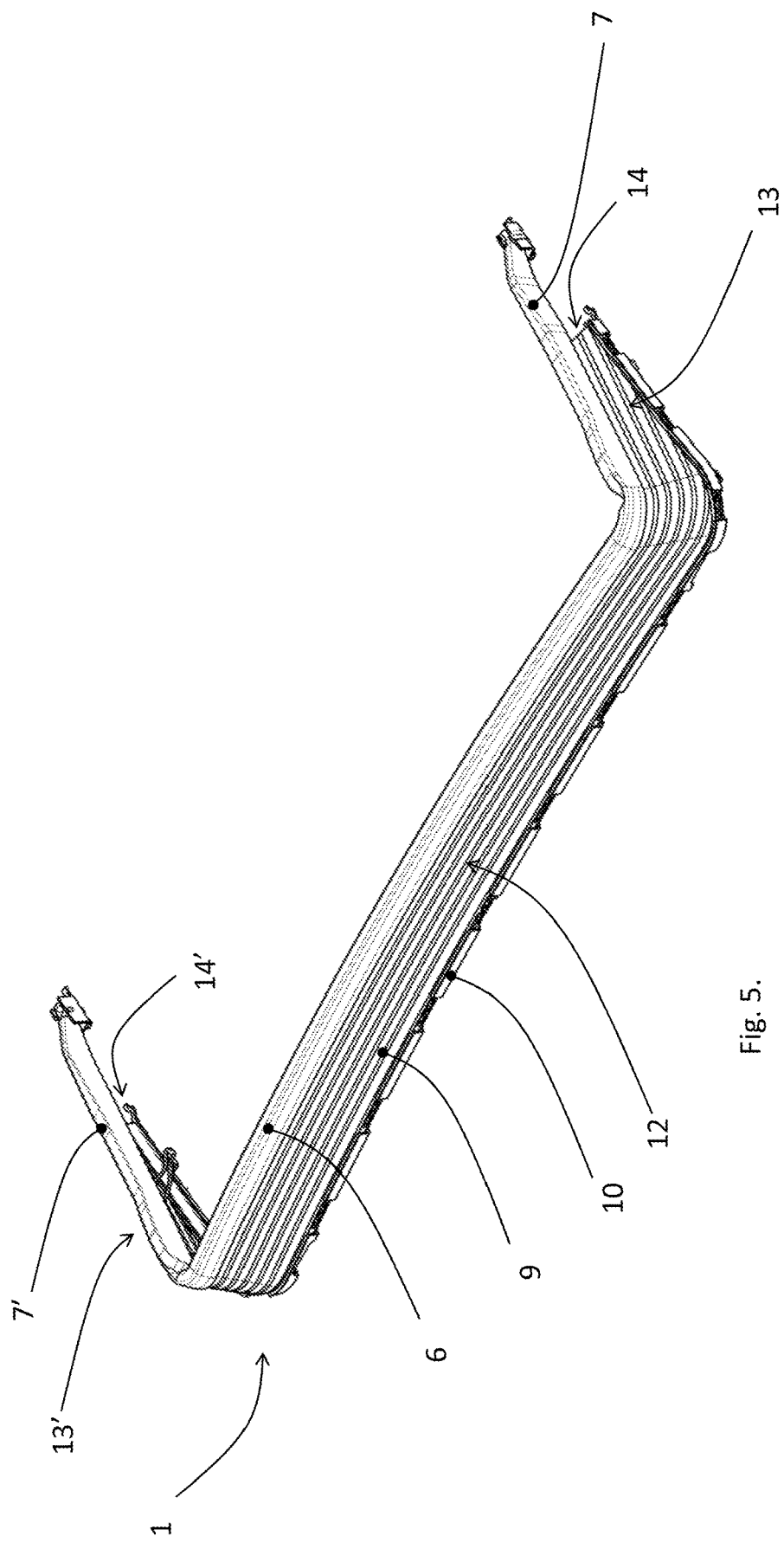
FIG. 5 is a schematic perspective view of the wind deflector assembly in an alternative embodiment.

Referring to FIG. 5 another embodiment is shown. Here the frontal part 12 and the lateral parts 13, 13' area equipped with strip-shaped second areas 16 having a second density 16', extending from one end part 14 continuously to the opposite end part 14' of the flexible wind deflecting material 9. The strip-shaped areas 16 are bound on both upper and lower sides by first areas 15 having a first density 15'. However it is conceivable that each of the second areas 16 having a second density 16' are bound on one edge by a first area 15 having a first density 15' and on the opposite edge by a third area 17 having a third density 17'. Generally, a first area 15 will be adjacent the upper elongate member 6.

Figure 6:
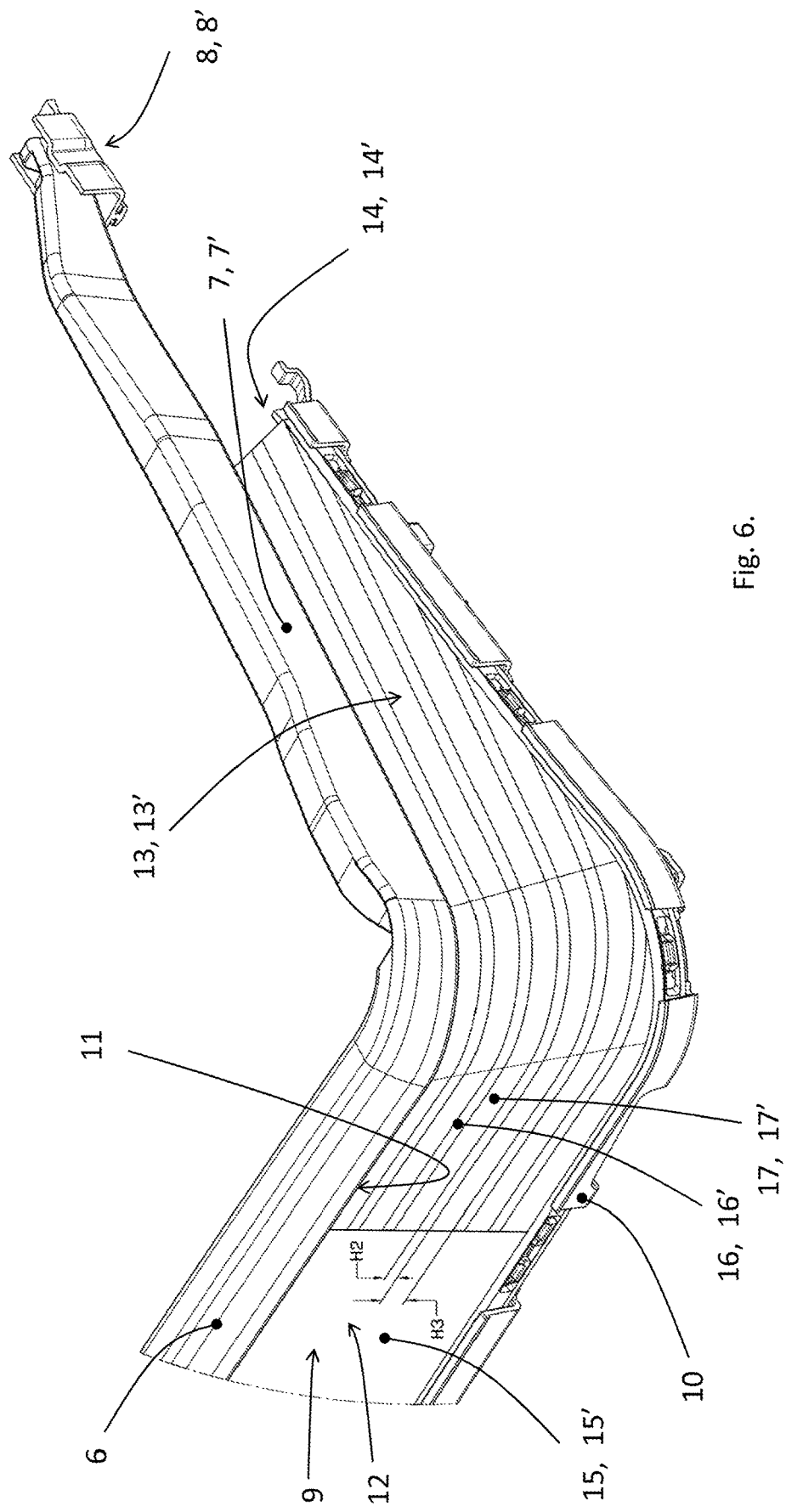
FIG. 6 is a view of a corner of the wind deflector assembly.

Referring to FIG. 6 another embodiment is shown whereby the strip-shaped second areas 16 having a second density 16' are bound by a third area 17 having a third density 17'. Said third density 17 may have a density which is lower than the second density 16', but higher than the first density 15' or may be higher than the first and second densities 15', 16'. The height H2 which may also be referred to as width H2 of the second area 16 may lie in a range of between 2 mm and 12 mm and preferably in the range of between 4 mm and 8 mm and in particular having a height of ca. 6 mm. A height H3, which may also be referred to as width H3 of the third area 17, lies in the range of 2 mm to 16 mm and more preferably in the range of 6 mm to 10 mm and in particular having a height of ca. 8 mm. In case the strip-shaped second areas 16 are bound by first areas 15, the ranges of dimensions for height H3 may also be used.

Both the second and third area 16, 17 extend from one end 14 of the flexible wind deflecting material 9 to an opposite end 14' on the frontal part 12. It is conceivable that due to the lack of height of the lateral part 13, 13' near the end part 14, 14', the second area 16 may not extend all the way to the end part. Generally, also the third area will be spaced from the upper elongate member 6 at least for the greater part of it.

Referring to FIGS. 7a, 7b and 7c, the flexible wind deflecting material 9 taken in isolation from its fixings to the upper elongated member 6 and stationary part 4 and the lower and upper fixing parts 10, 11, when laid on a flat plane, show a particular outer contour which is given by the 3D geometry of the wind deflector assembly 1.

In FIG. 7a the strip-shaped second area 16 extends perpendicular to the weaving directions W of the wind deflecting material 9.

In FIG. 7b the strip-shaped second area 16 extends parallel to the lower edge of the flexible wind deflecting material 9 such that the second areas 16 extend under an angle with the weaving direction W in the frontal part 12 and under another angle in the lateral parts 13, 13'.

In FIG. 7c the strip-shaped second area 16 extends parallel to the upper edge of the flexible wind deflecting material 9.

Similarly the strip-shaped second area 16 in the lateral part 13, 13' extends under yet another angle to the weaving direction W.

As the lateral part 13, 13' in FIGS. 7a, b, c are tapered towards the end part 14, 14', it may be conceivable that the strip-shaped second area 16 is also tapered and changes in the height H2 dimension extending towards the end part 14, 14'. It could be conceivable that in such case the first or third areas (15, 17) that bound the second area 16 are tapered too, such that dimension H3 also changes in height towards the end parts 14, 14'.

The invention is not limited to the embodiments described before which may be varied widely within the scope of the invention as defined in the appended claims. Features of the various embodiments may be combined in different ways. For example the complete wind deflecting material or preferably only the second and/or, if present, the third area may be impregnated or coated with a coating material to further enhance the stiffness of these areas. An example of a coating/impregnating material is resin/acryl. To impregnate the whole wind deflecting material, it is possible to unroll a roll of wind deflecting material and to pull it through a bath of liquid impregnating/coating material. After drying, the wind deflecting material can be rolled up again.

The base material of the wind deflecting material may for example be polybutyleneterephthalate (PBT), while the additional material (of the warp or weft, normally the threads parallel to the strip) of the strip-shaped second and third area's may be e.g. polyethersulfone (PES). Of course, it is also possible to just change the weaving density and use the same material through-out.

What is claimed is:

1. An open roof construction for a vehicle having a roof opening in its fixed roof, the open roof construction comprising:
   a stationary part,
   at least a closure movably connected with the stationary part and configured to close the roof opening in the fixed roof and to selectively open the roof opening,
   a wind deflector assembly being positioned near a front of the roof opening and being movable between an ineffective position below the fixed roof and an effective position above the fixed roof, the wind deflector assembly comprising:
   an upper elongate member having arms extending in a rearward direction, each of which are movably connected to the stationary part, by a hinge member, and
   a flexible wind deflecting material attached by a lower connecting part to the stationary part and by an upper connecting part to the upper elongate member to keep the flexible wind deflecting material taut in at least the effective position, said flexible wind deflecting material comprising a frontal part extending substantially along the front of the roof opening and further a lateral part extending from the frontal part to an end part of the flexible wind deflecting material near the hinge member, wherein said flexible wind deflecting material comprises a first area having a first weaving density, wherein the flexible wind deflecting material further comprises at least a second area having a second weaving density, wherein the second weaving density is higher than the first weaving density and the second area has a higher stiffness than the first area, wherein the first and second areas are one woven product and each of the areas is integrated in the woven product and interconnected to each other via a weaving process, said second area being shaped as a strip and extending at least partly in the frontal part and in the lateral part and being bound on both sides by flexible wind deflecting material having a different weaving density, and wherein the lateral part of the strip-shaped second area extends at least partly under an angle with regard to the frontal part of the strip-shaped second area.

2. The open roof construction of claim 1, wherein the second area extends continuously along the frontal and lateral parts of the flexible wind deflecting material.

3. The open roof construction of claim 1, wherein the second area is bound by at least a third area having a third weaving density.

4. The open roof construction of claim 3, wherein said first weaving density of said first area is lower than the second and third weaving density of the second area and third area, respectively, and wherein the second weaving density of the second area is higher than the third weaving density of the third area.

5. The open roof construction of claim 3, wherein said first weaving density of the first area is lower than the second and third weaving density of the second area and third area, respectively, and wherein the second weaving density of the second area is lower than the third weaving density of the third area.

6. The open roof construction of claim 1, wherein the second area has a height H2 in a range of 2 mm to 12 mm.

7. The open roof construction of claim 3, wherein the third area has a height H3 in a range of 2 mm to 16 mm.

8. The open roof construction of claim 1, wherein the flexible wind deflecting material is directly molded to the upper elongate member.

9. The open roof construction of claim 6, wherein the height H2 of the second area varies along the flexible wind deflecting material.

10. The open roof construction of claim 1, wherein the strip-shaped second area comprises threads of different materials for weft and warp of the flexible wind deflecting material.

11. The open roof construction of claim 1, wherein the strip-shaped second area comprises threads of different materials for weft and warp of the flexible wind deflecting material.

12. An open roof construction for a vehicle having a roof opening in its fixed roof, the open roof construction comprising:
a stationary part,
at least a closure movably connected with the stationary part and configured to close the roof opening in the fixed roof and to selectively open the roof opening,
a wind deflector assembly being positioned near a front of the roof opening and being movable between an ineffective position below the fixed roof and an effective position above the fixed roof,
the wind deflector assembly comprising:
an upper elongate member having arms extending in a rearward direction, each of which are movably connected to the stationary part, hinge member, and
a flexible wind deflecting material attached by a lower connecting part to the stationary part and by an upper connecting part to the upper elongate member to keep the flexible wind deflecting material taut in at least the effective position,
said flexible wind deflecting material comprising a frontal part extending substantially along the front of the roof opening and further a lateral part extending from the frontal part to an end part of the flexible wind deflecting material near the hinge member,
wherein said flexible wind deflecting material comprises a first area having a first weaving density,
wherein the flexible wind defecting material further comprises at least a second area having a second weaving density, wherein the second weaving density is higher than the first weaving density and the second area has a higher stiffness than the first area, wherein the first and second areas are one woven product and each of the areas is integrated in the woven product and interconnected to each other via a weaving process, said second area being shaped as a strip and extending at least partly in the frontal part and in the lateral part and being bound on both sides by flexible wind deflecting material having a different weaving density, and
wherein at least the second area of the flexible wind deflecting material is impregnated with a coating.

13. The wind deflector assembly of claim 12, wherein the second area extends continuously along the frontal and lateral parts of the flexible wind deflecting material.

14. The wind deflector assembly of claim 12, wherein the lateral part of the strip-shaped second area extends at least partly under an angle with regard to the frontal part of the strip-shaped second area.

15. A wind deflector assembly for an open roof construction comprising:
an upper elongate member having extending arms with a hinge member at an end of each arm, and
a flexible wind deflecting material attached to the upper elongate member, said flexible wind deflecting material comprising a frontal part extending substantially between the arms and a lateral part extending from each end of the frontal part to an end part of the flexible wind deflecting material near each hinge member,
wherein said flexible wind deflecting material comprises a first area having a first weaving density,
wherein the flexible wind deflecting material further comprises at least a second area having a second weaving density, wherein the second weaving density is higher than the first weaving density and the second area has a higher stiffness than the first area, wherein the first and second areas are one woven product and each of the areas is integrated in the woven product and interconnected to each other via a weaving process, said second area being shaped as a strip and extending at least partly in the frontal part and in each lateral part and being bound on both sides by flexible wind deflecting material having a different weaving density, and wherein the lateral part of the strip-shaped second area extends at least partly under an angle with regard to the frontal part of the strip-shaped second area.

16. The wind deflector assembly of claim 15, wherein the second area extends continuously along the frontal and lateral parts of the flexible wind deflecting material.

17. The wind deflector assembly of claim 15, wherein the second area is bound by at least a third area having a third weaving density.

18. The wind deflector assembly of claim 17, wherein said first weaving density of said first area is lower than the second and third weaving density of the second area and third area, respectively, and wherein the second weaving density of the second area is higher than the third weaving density of the third area.

* * * * *